Dec. 11, 1956  M. W. GRIFFES  2,774,023
OVERDRIVE CONTROL AND BRAKING SYSTEM
Filed May 18, 1954  3 Sheets-Sheet 1

INVENTOR.
MILTON W. GRIFFES
BY
RICHEY, WATTS, EDGERTON & McNENNY
BDWatts
ATTORNEYS Dec. 11, 1956 M. W. GRIFFES 2,774,023
OVERDRIVE CONTROL AND BRAKING SYSTEM
Filed May 18, 1954 3 Sheets-Sheet 3

INVENTOR.
MILTON W. GRIFFES
BY
RICHEY, WATTS, EDGERTON & McNENNY
B.D.Watts
ATTORNEYS 
United States Patent Office 2,774,023  
Patented Dec. 11, 1956

2,774,023
OVERDRIVE CONTROL AND BRAKING SYSTEM

Milton Wesley Griffes, Madison, Ohio, assignor to The Euclid Electric & Manufacturing Company, Madison, Ohio, a corporation of Ohio Application May 18, 1954, Serial No. 430,516

26 Claims. (Cl. 318—212)

This invention relates to alternating current electric motor drives for crane hoists and the like and, more particularly, to alternating current motor controls.

A principal object of the invention is to provide an alternating current crane hoist drive and control system therefor wherein a load may be raised or lowered at any desired predetermined speed.

Another principal object of the invention is to provide an alternating current crane hoist drive in which lowering of non-overhauling loads may be accomplished and in which the lowering of overhauling loads may be accomplished at any desired predetermined speeds less than the synchronous speed of the motor.

Another object of the invention is to provide an alternating current crane hoist drive in which arbitrary downdrive characteristics may be obtained for both overhauling and non-overhauling loads and to do so with a minimum of equipment ancillary to the hoist motor itself.

Still another object of the invention is to simplify alternating current crane hoist controls and to reduce the amount and complexity of the apparatus while improving the performance and operation thereof.

A still further object of the invention is to facilitate the crane operator's control of hoisting and lowering operations and to the end particularly that all kinds of loads may be lowered at any desired speed.

In the art pertaining to crane hoist drives, substantial difficulties are encountered in utilizing alternating current motor drives for the hoisting apparatus. In particular, the revolving field type of electric motor, which is the only type of motor suitable for this service, tends to run at synchronous speeds, e. g. speeds determined by the frequency of the alternating current supply and the number of poles of the motor. That characteristic is not overly objectionable during the hoisting operation since it is possible to incorporate resistors in the rotor or secondary circuit to obtain desirable speed-torque characteristics for a wide range of loads. However, for lowering operations, the difficulty is not readily overcome since the motor will always tend to run at synchronous speed. This is so inasmuch as, under no-load conditions, there is no load to exert a braking action, while, with overhauling loads, the loads tend to exert a torque in the same direction as the motor torque. However, the fact that alternating current power transmission is utilized throughout the industry has led to the adoption of elaborate control systems rather than resort to the use of the auxiliary supply equipment required for direct current motor drives.

In general, the control systems for alternating current crane hoist drives have this in common; that the speed-torque characteristic during lowering, whether at downdrive or overhauling load, is relatively steep, so that no speed control is obtained. This difficulty has been largely overcome in one system in which a brake generator or, to utilize a term employed in the art "an eddy current brake," is connected to the shaft of the drive motor so as to obtain a resisting torque whose magnitude is the function of the speed at which the motor is driven. By the use of such a brake in conjunction with a suitable drive control for the hoisting motor, relatively flat, stable, speed-torque characteristics may be obtained during lowering, whether downdrive or overhauling drive. In another system, the difficulty has been largely remedied by the use of a separate electromechanical device which modifies the drive motor excitation in accordance with the weight of the load being carried by the hoist apparatus. Both the above-described systems depend upon the use of ancillary apparatus to modify the inherent speed-torque characteristic of the drive motor with a resulting increase in the cost and complexity of the equipment required in a typical installation.

The present invention involves an overdrive control and braking system for crane hoists in which the desirable characteristics just referred to are obtained by suitable excitation of a three-phase, wound rotor, induction motor and without the use of auxiliary braking or other mechanical apparatus. The speed-torque characteristic of the motor is determined by applying alternating current to certain of the primary or stator windings of the motor, while simultaneously applying rectified alternating currents to those windings and the remaining. The windings are partially shunted by one or more low impedance circuits so as to provide a path for circulating currents which are generated within the motor and which, in turn, act to exert a resisting or braking torque upon the rotor of the motor. The shunt circuits include rectifiers which are connected in a direction such that the power line voltages cannot produce short-circuit currents through the circuits. In the embodiment of the invention disclosed herein, suitable switches and contactors are employed for connecting the motor for hoisting drive at various selected speeds and for lowering drive at various selected speeds in accordance with the principles of the invention.

It is an important feature of the invention that the drive control is accomplished with an absolute minimum of auxiliary equipment such as has heretofore been used, for example, to control the characteristics of the drive apparatus in accordance with the weight of the load.

The invention together with further objects, features and advantages will become apparent from a consideration of the following detailed specification and claims taken in connection with the accompanying drawings, in which:

Figure 1:
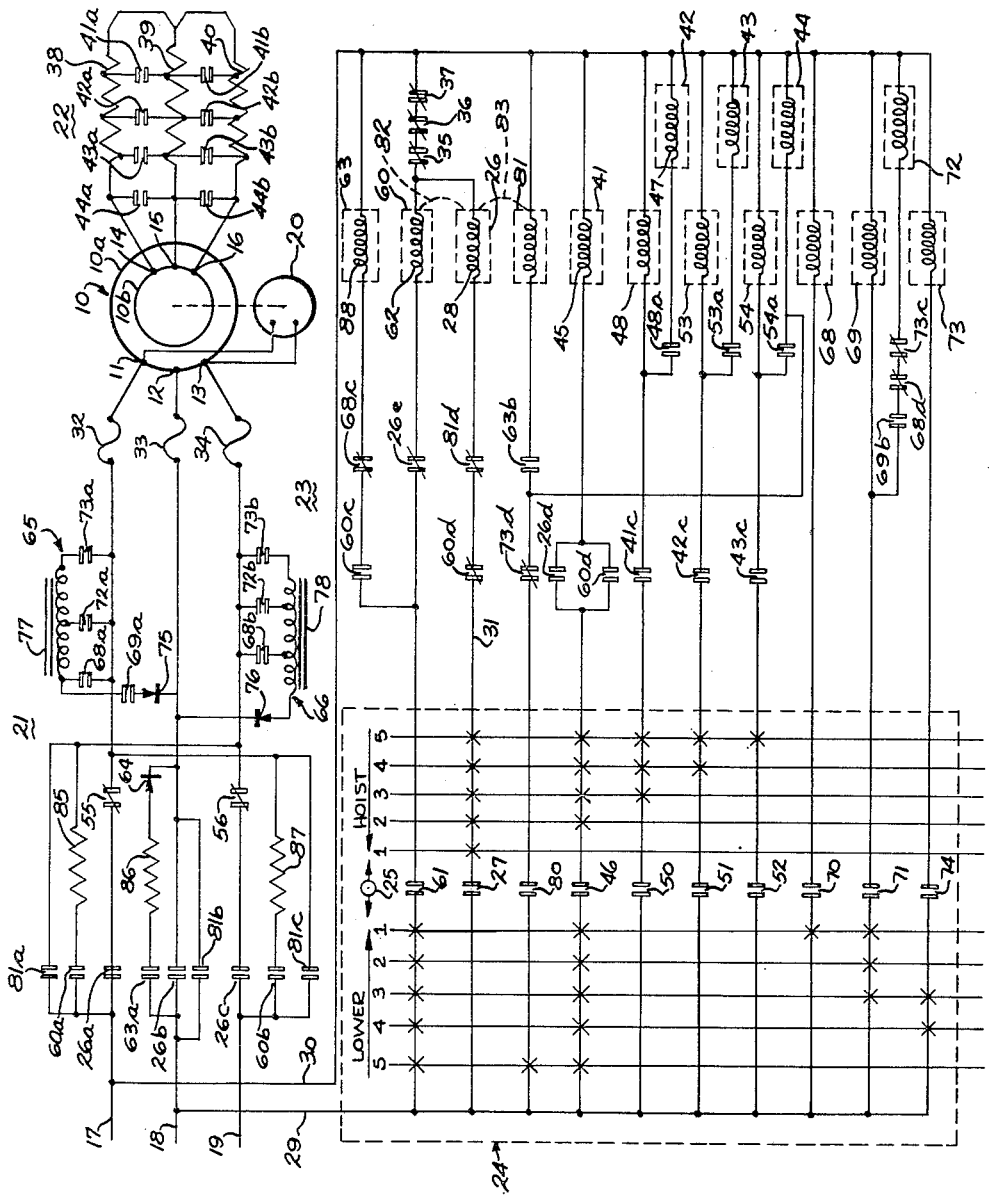
Fig. 1 is a diagrammatic representation of one embodiment of the invention.

Referring now to Fig. 1, a drive motor 10 is a three-phase, alternating current motor such as is utilized for driving the hoist machinery of a crane. The motor 10 is a conventional three-phase, wound rotor, induction motor having a stator and stator windings, referred to at 10a, and winding terminals conventionally represented at 11, 12 and 13, and a rotor and rotor windings, referred to at 10b, and winding terminals conventionally represented at 14, 15 and 16. The motor is energized by the usual three-phase alternating current power source (not shown), through three main power leads 17, 18 and 19. A single-phase alternating current brake 20 is connected to the power leads 17 and 19 and exerts a holding torque upon the motor shaft. When the motor is energized, the brake is released.

The apparatus of the invention includes a stator or primary circuit control apparatus 21 for applying three-phase alternating current voltages to the stator windings during hoisting drive and for interconnecting the apparatus in that circuit for lowering drive as hereinafter described. A rotor control apparatus 22 includes resistors and contactors for selectively changing the secondary circuit resistance to vary the speed at which the motor operates. An electric control apparatus 23 incorporates such switches and contactors as are necessary to operate the apparatus of circuits 21 and 22 and perform the necessary switching and other interconnecting operations. In particular, a master controller 24 having a handle 25 is a manually operated rotary sequence switch of a type well known in the art. The handle 25 is adapted to be moved by the crane operator to any one of several positions according to the direction and speed of drive required, e. g. for hoisting the load or lowering the load.

The power leads 17, 18 and 19 are connected to the terminals 11, 12 and 13 for forward or hoisting drive by means of three main contacts 26a, 26b and 26c of a main contactor 26. The contactor 26 is energized by a contact 27 of the master controller 24, connected in series with the solenoid 28 of the contactor 26, and a control energizing circuit which includes control power leads 29 and 30 from the main power leads 17 and 18. The main contactor 26 is closed during all hoisting positions of the master controller as is indicated by the crosses at the intersection of the vertical lines indicated as 1, 2, 3, 4 and 5, denoting controller handle positions, and the lead 31 to the contacts 27.

Three overload relays are provided for interrupting the primary circuit in the event that excessive currents are drawn and have the thermal elements 32, 33 and 34 thereof connected in series with the main power leads 17, 18 and 19 and the normally closed contacts 35, 36 and 37 thereof connected in series with solenoid 28 of the contactor 26.

When the motor 10 is excited for hoisting drive, the speed of the motor is adjusted by changing the amount of resistance in the rotor circuit of the motor. The secondary control apparatus 22 includes three acceleration resistors 38, 39 and 40 of a type well known in the motor control art, while a number of acceleration contactors 41, 42, 43 and 44 have the contacts thereof connected across portions of the resistors so that the resistance of the circuit may be changed by actuating and deactuating the contactors.

A first acceleration contactor 41 has the contacts 41a and 41b thereof connected to the resistors 38 and 40 and to the resistor 39 for shunting a portion of the resistors when the contacts are closed. The solenoid 45 of contactor 41 is energized through a contact 46 of the master controller 24 and through the normally open contacts 26d of the main contactor 26. The contactor 41 is actuated and the contacts 41a and 41b closed in the second, third and fourth and fifth hoisting positions of the main switch and, by reason of contacts 26d, may only be actuated when the main contactor 26 is in a closed position.

A second acceleration contactor 42 has contacts 42a and 42b connected to the resistors 38 and 40 and to resistor 39 for shunting a further portion of the resistors from the active circuit when the contacts are closed. The solenoid 47 of the contactor 42 is energized through a contact 48a of a time delay relay 48 which is, in turn, energized by a contact 50 of the master controller 24. A normally open contact 41c of the first acceleration contactor 41 is connected in series with the contact 50 and the solenoid of the relay 48 and the contactor 42, so that the relay 48 and the contactor 42 may only be actuated after the contactor 41 has been closed. The time delay relay 48 is provided so as to insure an acceleration interval between the closing of contacts 41a and 41b and contacts 42a and 42b in the event that the operator moves the handle 25 directly from position 1 to position 3.

In like manner, the third and fourth acceleration contactors 43 and 44 having contacts 43a and 43b and 44a and 44b connected to the resistors 38 and 40 and to resistor 49 for shunting further portions of the resistors when the contacts are closed. Contactors 43 and 44 are operatively actuated by contacts 51 and 52 of the master controller 24 and time delay relays 53 and 54, respectively. The time delay relays 53 and 54 have their solenoids connected in series with the normally open contacts 42c and 43c, respectively, of the preceding acceleration contactors, so that the time delay relays are energized only after the previous contactor has been closed. Relay 44 is energized in the fifth position of the handle 25 and contacts 44a and 44b are shunted directly across the terminals 14, 15 and 16 of the rotor so that the motor 10 runs at full synchronous speed when these contacts are closed. When the handle 25 is returned to the off position, all contactors are opened and the motor is deenergized.

Two limit switches 55 and 56 are connected in series with the power leads 17 and 19 and are effective to deenergize the motor 10 when the hoist apparatus reaches certain predetermined extreme positions.

For lowering drive, the control apparatus functions to apply single-phase alternating current voltage to the stator terminals 11 and 13 and to apply rectified alternating current voltages to the stator terminal 12, while connecting shunt circuits between the terminals 11 and 12 and between the terminals 13 and 12. Also, in accordance with the present invention, means are provided for adjusting the impedance of one or both of the shunt circuits in order to maintain the speed of the motor constant within predetermined limits during downdrive and overhauling drive.

For lowering drive, power leads 17 and 19 are connected to the terminals 13 and 11, respectively, by the contacts 60a and 60b of a second main contactor 60, to excite two of the stator windings in the motor 10 with single-phase alternating current. The contactor 60 is acuated by a contact 61 of the master controller 24 which is connected in series with the solenoid 62 of the contactor 60. A normally closed contact 26e of the main contactor 26 and the overload contacts 35, 36 and 37 are also connected in series with the solenoid 62. The contact 61 is closed in all five lowering positions of the handle 25 and the contacts 26e insure that the contactor 60 cannot be actuated until the contactor 26 has been deactuated and the contacts 26e returned to their normally closed condition. The currents which result from the application of the single-phase alternating current voltages to terminals 11 and 13 produce stationary fields in the motor 10. The stationary fields induce currents in the rotor windings which, in turn, produce braking torques upon the rotor to control the speed of the motor during lowering drive.

The power lead 18 is connected to the third stator terminal 12 by means of a contact 63a of a third contactor 63 to connect a rectifier 64 in series with that lead to excite all three of the stator windings with rectified alternating current voltages. The solenoid 88 of the contactor 63 is connected to the contact 61 of the master controller 24 through normally open contact 60c of the second main contactor 60 so that the contactor 63 may be actuated by the master controller 24 only when the contactor 60 is closed. The rectified alternating current voltages produced by connecting the rectifier 64 between the power lead 18 and the terminal 12, with the leads 17 and 19 connected to the terminals 13 and 11, respectively, energize the stator windings of the motor 10 to produce an intermittent rotating field and corresponding intermittent driving torque upon the rotor 10b. During the times when the rectifier 64 conducts current in the proper relation to the three separate phase voltages, the rotating field is produced while, during the periods when the rectifier 64 is not so conducting current, only the alternating current phase voltages of leads 17 and 19 are applied to the terminals 11 and 13 to produce a single-phase current in the associated windings.

The voltages applied to the stator windings of the motor, whether applied to terminals 11 and 13 only, as when contacts 69a and 69b are closed, or to terminals 11, 12 and 13 simultaneously when contact 63a is closed, produce currents in the rotor windings of the motor 10 which, in turn, produce corresponding counter-emf's in the stator coils. These counter-emf's are employed to generate circulating currents in two shunt circuits 65 and 66 which are connected to the stator terminals 11 and 12 and 13 and 12, respectively.

The shunt circuits 65 and 66 perform a dual function. First, the high circulating currents which are generated in the stator windings of the motor 10 as a result of the relatively low impedance shunt path through the circuits 65 and 66 produce strong braking forces upon the rotor of the motor. Secondly, by reason of the presence of the rectifiers 75 and 76, rectified alternating currents flow in two loops, one from lead 17 through shunt circuit 65 to terminal 12 through the associated stator coil to terminal 13 and thence to power lead 19, and the other from power lead 19 through the shunt circuit 66 to terminal 12 and the associated stator coil to terminal 11 and the power lead 17. These currents produce stationary fields for producing purely braking torques similar to that produced when the coils connected to terminals 11 and 13 are energized with single-phase alternating current alone. It is an important feature of the invention that the use of the rectifier 64 in series with the power lead 18 and the use of the rectifiers 75 and 76 in the shunt circuits 65 and 66 cooperate to prevent short-circuit currents between the power leads 17 and 18 and 18 and 19, while forming the circuits referred to above.

The two shunt circuits 65 and 66 are connected directly to the terminals 12 of the motor and are connected to the terminals 11 and 13 by the separate contacts of contactors 68, 69, 72 and 73. Of these contactors, contactor 68 has a contact in each of the shunt circuits, e. g. contacts 68a and 68b, respectively, for opening and closing both shunt circuits simultaneously. Contactor 68 has its solenoid connected in series with and energized by the contact 70 of the master controller 24. Contactor 69 has the contacts 69a only in the shunt circuit 65 to open and close that circuit and has its solenoid connected to and energized by contact 71 of the master controller 24. Actuation of the contactor 68, therefore, opens or closes shunt circuits 65 and 66 simultaneously, while actuation of contactor 69 opens or closes only shunt circuit 65. Contactor 69 is energized and contact 69a is closed in the first three lowering positions of the handle 25, while contactor 68 is energized and contacts 68a and 68b are closed only in the first lowering position of the handle 25.

The two contactors 72 and 73 have the contacts 72a and 72b and 73a and 73b thereof connected from the terminals 11 and 13 to the taps of two associated saturable reactors 77 and 78 to control both shunt circuits simultaneously. Contactor 72 is energized by the contact 71 of the master controller 24 through the normally open contact 69b of the contactor 69 and normally closed contacts 68d and 73c of contactors 68 and 73. Since contacts 69b, 68d and 73c are all closed only in the second position of the operating handle 25, contactor 72 is actuated and contacts 72a and 72b are closed only in that position. Contactor 73 is energized by a contact 74 of the master controller 24 and is energized in the third and fourth positions of the handle 25. Actuation of contactor 73 opens contact 73c, deenergizing contactor 72, which opens contacts 72a and 72b in the third and fourth positions. It will be seen that the shunt circuit 65 is connected between the stator terminals 11 and 12 only in the first three lowering positions of the handle 25, while the shunt circuit 66 is connected between the terminals 13 and 12 in the first four lowering positions. It is to be understood, of course, that with both the shunt circuits connected to the motor, a greater total circulating current flow may be produced and greater braking torque generated in the rotor 10b.

Inasmuch as the contacts 69a and either contacts 68a and 68b, 72a and 72b, or 73a and 73b are closed in the first three lowering positions, it will be seen that stationary fields effective to produce braking torques will be produced by the rectified alternating current voltages applied to terminals 12 and 13 through shunt circuit 65 and the rectified alternating current voltages applied to terminals 11 and 12 through shunt circuit 66 as well as the single-phase alternating current voltages applied to terminals 11 and 13.

In the fourth lowering position, contact 69a is open so that the stationary field is produced only by the single-phase alternating currents applied to terminals 11 and 13 and the rectified alternating current voltages applied to terminals 11 and 12 through shunt circuit 66.

The rectifier 64 is a half-wave selenium rectifier which is connected so that the direction of current flow is from the power lead 18 to the stator terminal 12. The shunt circuit rectifiers 75 and 76 are also selenium rectifiers connected so that the direction of current is from the terminals 11 and 13 to the terminal 12. The representation of the rectifiers and the direction of current flow is conventional and other types of rectifiers may be utilized within the spirit of the invention.

The shunt circuits 65 and 66 incorporate reactors 77 and 78 which resist the flow of circulating currents between the stator terminals 11 and 12 and 13 and 12, respectively. The impedance of the reactors tends to limit the amount of circulating current which can flow so that the amount of braking torque which is exerted upon the rotor 10b of the motor at any given speed may be changed by changing the inductance of the reactors. In the embodiment of the invention shown here, each of the reactors 77 and 78 is made adjustable so that the shunt circuit may be adjusted for different operating or load conditions of the motor. The reactors 77 and 78 are tapped, e. g. adjustable to accommodate the associated contactors 72 and 73, referred to above, but may also be made variable as set forth hereinafter.

The embodiment of the invention of Fig. 1 incorporates provisions for lowering at full synchronous speed, that is, with full three-phase alternating current line voltage excitation. The excitation for such drive is provided in the fifth lowering position of the master controller 24 wherein a contact 80 is closed to energize a contactor 81 and its contacts 81a, 81b and 81c. Contacts 81a, 81b and 81c connect the power leads 17, 18 and 19 to the terminals 13, 12 and 11, respectively, for exciting the motor 10 with the full three-phase line voltage for substantial induction braking, as is well known in the art. Contactor 44 is energized with contactor 81 to close contacts 44a and 44b of the secondary circuit control 22 to reduce the secondary circuit resistance to a minimum and obtain the maximum braking effort for lowering overhauling loads at full synchronous speed.

Contacts 73d and 63b of contactors 73 and 63, respectively, are connected in series with contactor 81. Contacts 73d are normally closed contacts so that contactor 81 can be actuated only when contactor 73 is deactuated, while contacts 63b are normally open contacts so that contactor 81 may be actuated only when contactor 63 is actuated.

Contactors 60 and 26, contactors 26 and 81 and contactors 81 and 73, respectively, are mechanically interlocked as well as electrically interlocked to further insure against improper operation of the several contactors. The first two mechanical interlocks are represented symbolically at 82 and 83 and constitute pivoted mechanical members to prevent the one contactor from moving independently from the other.

Contactor 60 is closed in the fifth lowering position of the master controller 24 so that the actuation of contactor 81 and the closing of contacts 81a and 81c shunts the line dropping resistors 85 and 87. Contact 81b shunts the line dropping resistor 86 and the rectifier 64 since contactor 63 remains closed in the fifth lowering position. The line dropping resistors 85, 86 and 87 function to reduce the line voltage applied to the stator terminals 11, 12 and 13 in the first four lowering positions of the master controller 24.

Figure 2:
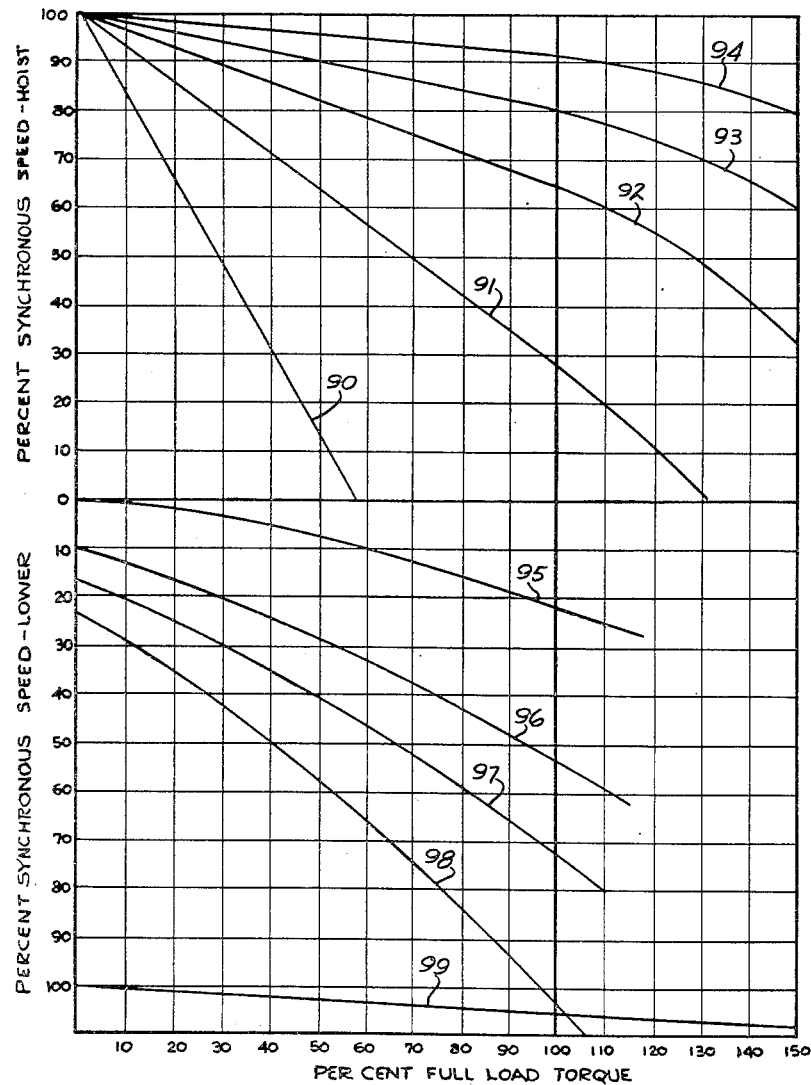
Fig. 2 is a speed-torque diagram particularly setting forth the drive characteristics of the apparatus under various conditions.

In operation, the crane operator moves the handle 25 in one direction for hoisting drive and in the opposite direction for lowering drive. When the handle 25 is moved to the first hoisting position, the contact 27 is closed and contactor 26 is actuated to close contacts 26a, 26b and 26c. The motor 10 is energized at full line voltage and the brake 20 is released, allowing the motor to run at a speed determined by the full value of the secondary circuit resistors 38, 39 and 40. The speed-torque characteristic of the motor for the excitation of the first hoist position is shown in curve 90 of Fig. 2.

When the handle 25 is moved to the second hoist position contact 27 remains closed and contact 46 is closed to actuate contactor 41. Contact 26d, in series with the contactor 41, is closed when contactor 26 is actuated, so that contactor 41 may be closed by contact 46 of controller 24. Contacts 41a and 41b are closed to shunt portions of the secondary resistors 38, 39 and 40 and allow the motor 10 to run at a higher speed. The speed-torque characteristic of the motor for the excitation of the second hoist position is shown in curve 91 of Fig. 2.

When the handle 25 is moved to the third hoist position, contacts 27 and 46 of the master controller 24 remain closed, while contact 50 is closed to energize time delay relay 48. The contact 41c of contactor 41, in series with the time delay relay 48, was closed when the contactor 41 was actuated in the second hoist position, so that, upon the elapse of a predetermined interval after the closing of contact 50, contacts 48a of time delay relay 48 will close to actuate the contactor 42. When contactor 42 is actuated, contacts 42a and 42b are closed to shunt out a further portion of the secondary resistors 38, 39 and 40 and allow the motor 10 to run at a third speed. The speed-torque characteristic of the motor for the excitation of the third hoist position is shown in curve 92 of Fig. 2.

When the handle 25 is moved to the fourth hoist position, contacts 27, 46 and 50 of the master controller remain closed and contact 51 is closed to energize the time delay relay 53. The contact 42c of contactor 42, in series with the time delay relay 53, was closed when contactor 42 was actuated, so that the contactor 53a of time delay relay 53 is closed upon the elapse of a predetermined interval after the contact 51 is closed. When contact 53a is closed, contactor 43 is actuated to close contacts 43a and 43b and shunt out further portions of the secondary resistors 38, 39 and 40 and allow the motor 10 to run at a fourth speed. The speed torque characteristic of the motor for the excitation of the fourth hoist position is shown in curve 93 of Fig. 2.

When the handle 25 is moved to the fifth hoist position, contacts 27, 46, 50 and 51 of the master controller 24 remain closed and contact 52 is closed to energize time delay relay 54 through contact 53c of contactor 43. Contact 43c was closed when contactor 43 was actuated so that contact 54a of relay 54 is closed upon the elapse of a predetermined interval after the contact 52 is closed. Thereupon, contactor 44 is actuated and contacts 44a and 44b are closed to shunt out the remaining portion of the secondary resistors 38 and 39 and 40 to allow the motor 10 to run at its highest speed. The speed-torque characteristic of the motor for the excitation of the fifth hoist position is shown in curve 94 of Fig. 2.

When the handle 25 is returned to the off position, the contacts 27, 46, 50, 51 and 52 of controller 24 are opened and the associated contactors referred to above are deenergized. Contacts 26a, 26b and 26c are opened, the motor 10 is deenergized, and the brake 20 is deenergized to hold the shaft of the motor. It is to be noted that if the crane operator moves the handle 25 directly from the off position into one of the higher speed hoisting positions, the contactors will nevertheless be operated in a fixed sequence and with appropriate time intervals to allow the motor to accelerate properly from one speed to each successive higher speed.

When the handle 25 is moved to the first lowering position, contact 61 is closed to actuate contactor 60 and close contacts 60a and 60b. When contacts 60a and 60b are closed, single-phase alternating current is applied to the terminals 13 and 11 through dropping resistors 85 and 87. The brake 20 is released when contacts 60a and 60b are closed and contact 60d is opened so that the contactor 26 may not be actuated to close contacts 26a, 26b and 26c.

When contact 61 of the master controller 24 is closed, contacts 46, 70 and 71 are closed to actuate contactors 41, 68 and 69, respectively. Upon the actuation of contactor 41, contacts 41a and 41b are closed to shunt a portion of the acceleration resistors 38, 39 and 40 and reduce the secondary circuit resistance to a proper value for the required braking torque. The actuation of contactor 68 closes contacts 68a and 68b to connect the shunt circuits 65 and 66 to the respective motor terminals 11 and 13, while the actuation of contactor 69 closes contact 69a to close the shunt circuit 65.

In this first lowering position, the single-phase alternating current excitation together with the two shunt circuits 65 and 66 is effective to permit a full load to be lowered at about 20% of the full motor speed. The speed-torque characteristic for the first lowering position of the handle is shown in curve 95 of Fig. 2.

In the second lowering position, contacts 61, 46 and 71 of the master controller 24 remain closed and contactors 60, 41 and 69 remain actuated. Contact 70 of the master controller is opened to deactuate contactor 68 and open contacts 68a and 68b and close contacts 68c and 68d. Upon the closing of contact 68c, the solenoid 88 of contactor 63 is enregized through the closed contact 61 of the master controller 24 and the closed contact 60c of contactor 60. Upon the actuation of contactor 63, contact 63a is closed to connect the power lead 18 to the motor terminal 12 through the dropping resistor 86 and the line rectifier 64. Simultaneously therewith, the solenoid of contactor 72 was energized when the contact 68d was closed so that the contacts 72a and 72b were closed to connect a larger portion of the saturable reactors 77 and 78 in the shunt circuits 65 and 66. By reason of the increased reactance of the shunt circuits, the magnitude of the circulating currents is reduced to allow the motor to run at a higher speed.

In the second lowering position, alternating current voltages are applied to the terminals 11 and 13 and rectified alternating current voltages are applied to the terminal 12 and the reactance of the shunt circuits 65 and 66 is increased. The excitation of the drive motor under these conditions produces a downdrive torque for relatively light loads and a braking torque sufficient to permit a full load to be lowered at 55% of full motor speed. The speed-torque characteristic of the drive motor for the excitation of the second lowering position of the master controller handle is shown in curve 96 of Fig. 2.

In the third lowering position, contacts 61, 46 and 71 of the master controller 24 remain closed and contactors 60, 63, 41 and 69 remain actuated as in the second lowering position. However, contact 74 of the master controller is closed to actuate contactor 73. When contactor 73 is actuated, contacts 73a and 73b are closed, and contact 73c is opened to deactuate contactor 72 and open contacts 72a and 72b. As a result, further portions of the shunt reactors 77 and 78 are connected in the shunt circuits 65 and 66 to increase the reactance in the shunt circuits and decrease the circulating current and the braking torque produced in the motor 10 at any given speed. The resultant excitation produces a downdrive torque for relatively light loads and a braking torque sufficient to permit a full load to be lowered at 70 to 75% of full motor speed. The speed-torque characteristic of the motor for the excitation of the third lowering position is shown in curve 97 of Fig. 2.

In the fourth lowering position, the energization of the motor 10 remains the same as in the third lowering position with the exception that the contact 71 of the master controller 24 is opened to deactuate contactor 69. The reactuation of contactor 69 opens contacts 69a to disconnect the shunt circuit 65, while shunt circuit 66 remains active. This excitation produces a further increase in downdrive torque for relatively light loads of approximately 25% of full speed and permits a full load to be lowered at substantially synchronous speed. The speed-torque characteristic of the motor for the excitation of the fourth lowering position is shown in curve 98 of Fig. 2.

In the fifth lowering position, contacts 61 and 46 of the master controller remain closed and contactors 60, 63 and 41 remain actuated. However, contact 74 of the master controller is opened to deactuate contactor 73 and return contact 73d to its normally closed position. Simultaneously therewith, contact 80 of the master controller is closed, thus actuating contactors 81 and 44. Upon the actuation of contactor 81, contacts 81a, 81b and 81c are closed to shunt the line dropping resistors 85 and 87 and the line dropping resistor 86 and the rectifier 64 and apply full line voltage to the motor 10. The actuation of contactor 44 shunts the secondary resistors 38, 39 and 40 to reduce the secondary circuit resistance to a minimum. This excitation produces full braking torque on overhauling loads as shown by curve 99 in Fig. 2.

When the handle 25 is returned to the off position, contacts 61, 46 and 80 of controller 24 are opened and the associated contactors referred to above are deenergized. The handle 25 may, of course, be returned from the fifth lowering position to any of the intermediate lowering positions.

In the embodiment of Fig. 1, the shunt circuits 65 and 66 each include a saturable reactor for limiting the amount of current which may flow in the shunt circuits. The characteristics of the saturable reactor taken in connection with the character of the circulating currents flowing in those reactors, e. g. rectified alternating currents, is such that the reactance of the reactors changes in a desirable way with the change in current magnitude. Thus, as the circulating currents in the shunt circuits increase with the increase in motor speed due to an increase in the amount of load carried by the hoist motor, the increased amplitude of the circulating rectified alternating currents tends to reduce the reactance of the series reactor by reason of the increased saturation brought about. Consequently, the current increase for a given increase in motor speed will be greater than if a constant impedance type of reactor were utilized in the shunt circuits. As a result, the tendency of the arrangement is to hold the lowering speeds constant, over a wide range of load torques than has heretofore been generally possible except by the use of elaborate auxiliary apparatus.

The shunt circuit arrangements of Fig. 1 are particularly advantageous in that a wide variety of operating requirements are met by a simple adjustment of the components of those circuits. Thus, the saturable reactor may be completely shunted so that the shunt circuit 65 comprises merely the rectifier 75 connected directly across the terminals 11 and 12 of the motor 10. The shunt circuit 65 may be omitted entirely, as set forth above, when contact 69a is open, or any combination of values of the reactor 78 in the shunt circuit 66 may be utilized therewith.

Figure 3:
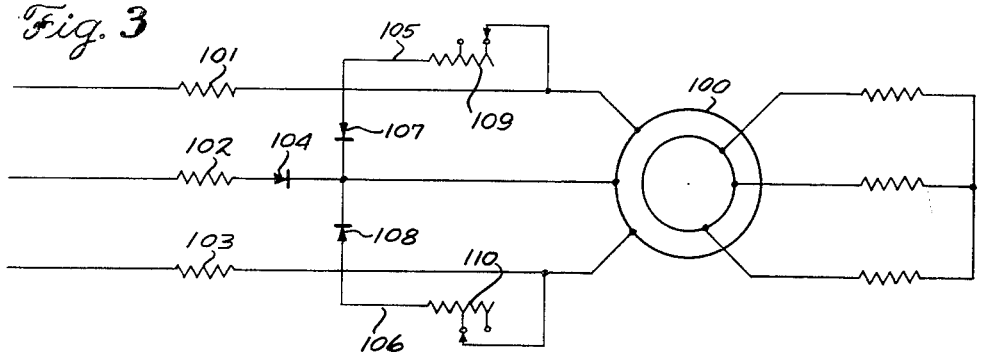
Fig. 3 represents an alternative embodiment of the invention, in one aspect thereof, utilizing resistors as fixed impedance elements in the shunt circuits of the control apparatus.

While the use of saturable reactors in the shunt circuits is particularly advantageous, it is by no means intended that the invention should be limited to the utilization of such reactors. Thus, as shown in Fig. 3, the motor 100 is connected to a three-phase alternating current line through three line dropping resistors 101, 102 and 103, corresponding to the resistors 85, 86 and 87 of Fig. 1, and a rectifier 104 in the center lead thereof. Two shunt circuits 105 and 106 include rectifiers 107 and 108 corresponding to rectifiers 75 and 76, respectively. Tapped resistors 109 and 110 comprise fixed impedance current limiting elements, e. g. elements whose impedance is not determined by the magnitude of the current. The embodiment of Fig. 3 is similar to that of Fig. 1 in that the adjustment of each of the shunt circuits 105 and 106 is independent of the other.

Figure 4:
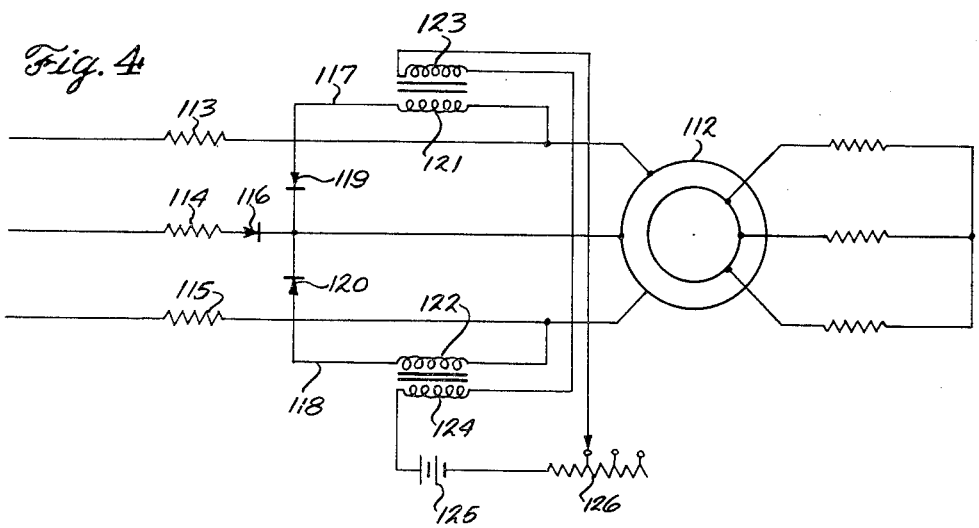
Fig. 4 represents an alternative embodiment of the invention, in one aspect thereof, in which the impedance of two shunt circuits is varied simultaneously.

Referring now to Fig. 4, there is shown an alternative embodiment of the invention in which the adjustment of the shunt circuit impedances of both circuits is accomplished simultaneously. The motor 112 is supplied from a three-phase alternating current line through the three line dripping resistors 113, 114 and 115 and a series rectifier 116. The shunt circuits 117 and 118 include rectifiers 119 and 120 and two saturable reactors 121 and 122. The reactors 121 and 122 are of known form having two separate windings, one comprising a main winding which is connected in the series circuit, while the remaining winding constitutes a control winding which is energized in such a manner as to change the degree of saturation of the reactor core. In the arrangement of Fig. 4, the control windings 123 and 124 of the reactors 121 and 122 are connected in series and suitably energized by a direct current supply represented symbolically by the battery 125. A tapped resistor 126 may be adjusted to vary the current in the control windings. It will be recognized that adjustment of the tapped resistors 126 will not only modify the lowering speed of the motor at any given load, but will modify the entire speed torque characteristic of the motor by reason of the change in saturation effect produced by the circulating rectified alternating currents. The main windings 121 and 122 may be tapped and connected to the associated power leads by means of a number of contactors such as the contactors 72 and 73 of Fig. 1 so that the speed-torque characteristic may be controlled over several ranges of speeds and load conditions.

Figure 5:
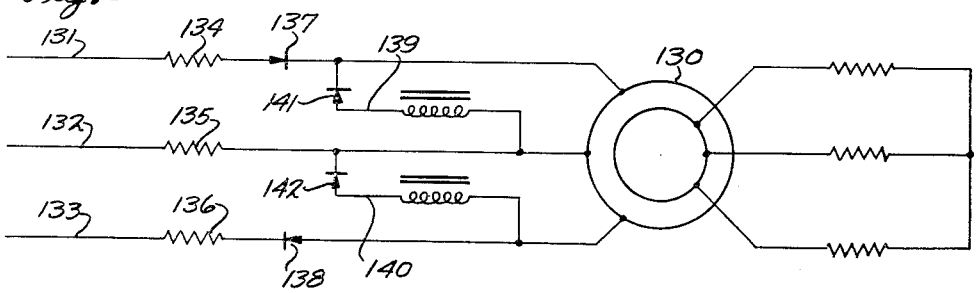
Fig. 5 represents an embodiment of the invention showing an alternate method of deriving the rectified alternating currents for exciting the motor stator.

The embodiment of the invention of Fig. 1 employed a single series rectifier 64 in the power supply lead 18 in order that the rectified alternating currents might be applied to the stator windings, while simultaneously applying single-phase alternating currents to one of the stator windings through the power supply leads 17 and 19. That arrangement has certain advantages insofar as it tends to reduce the total line current under heavy loads, but the invention is by no means limited to such an arrangement. Thus, in Fig. 5, the motor 130 is connected to three three-phase alternating current power leads 131, 132 and 133 through three dropping resistors 134, 135 and 136 and two series rectifiers 137 and 138. Two shunt circuits 139 and 140 provide paths for generating circulating currents as in the previous embodiments. The rectifiers 137 and 138 are connected so that any current flowing from line 131 to 133 must be always in the same direction through the corresponding stator windings of the motor 130. Rectifiers 141 and 142 of the shunt circuits 139 and 140 are also connected in the same direction, but with both rectifiers in opposition to rectifiers 137 and 138. Circulating currents generated by the counter-E. M. F.'s in the motor 130 are thus permitted to flow through the shunt circuits, while the line voltages cannot develop currents in the shunt circuits.

The various line dropping resistors serve, of course, primarily as current limiting resistors, and are, by no means, essential to the practice of the invention. Thus, in applications of the invention where only variable negative torques are to be produced, the line voltages may be reduced to any arbitrary values suitable for the particular operating conditions encountered.

The motor 10 is a three-phase alternating current, wound rotor induction motor. The representation of Fig. 1 is intended to mean that the windings of the motor are Y-connected, that is, so that each of the terminals represented at 11, 12 and 13, constitutes the terminus of a stator winding, while each of the terminals represented at 14, 15 and 16 constitutes the terminus of a rotor winding. However, the invention is not necessarily limited to such an arrangement and the various windings may be arranged in a so-called delta-connection or in a suitable combination of Y- and delta-connections.

It is to be understood that the specific nature of the present disclosure is not intended to be restrictive or confining, but that various rearrangements of the apparatus may be resorted to giving effect to a reasonable breadth of construction of the express language of the claims, as hereinafter set forth.

What is claimed is:

1. Alterating current hoist apparatus comprising, in combination, a three-phase, wound rotor induction motor having rotor windings and three rotor terminals therefor, and stator windings and three stator terminals therefor, three three-phase alternating current power leads, means connecting two of the power leads directly to two of the stator terminals to apply alternating current voltages to those terminals, a rectifier, and means connecting the said rectifier from the third power lead to the third stator terminal for applying rectified alternating current voltages to that terminal to produce rectified alternating currents through the said terminal and stator windings, and means connecting a shunt circuit from one of the first two stator terminals to the said third stator terminal for circulating alternating currents from the said first-named terminal to the said third terminal, the said shunt circuit including a series rectifier connected in opposition to the first-named rectifier and the said third power lead for maintaining high impedance paths between the power leads and passing rectified alternating currents through the stator winding connected to the remaining one of the said two stator terminals.

2. Alternating current hoist apparatus comprising, in combination, a three-phase, wound rotor induction motor having rotor windings and three rotor terminals therefor, and stator windings and three stator terminals therefor, three three-phase alternating current power leads, means connecting two of the power leads directly to two of the stator terminals to apply alternating current voltages to those terminals, a rectifier, and means connecting the said rectifier from the third power lead to the third stator terminal for applying rectified alternating current voltages to that terminal to produce rectified alternating currents through the said third terminal and through the stator windings, and means connecting a shunt circuit from one of the first two stator terminals to the said third stator terminal for circulating alternating currents from the said first-named terminal to the said third terminal, the said shunt circuit including a series rectifier connected in opposition to the rectifier and the said third power lead for maintaining high impedance paths between the power leads and for passing rectified alternating currents through the stator winding connected to the remaining one of the said two stator terminals, and impedance means connected in series with the rectifier in the said shunt circuit for limiting the circulating currents in the said shunt circuit.

3. Alternating current hoist apparatus comprising, in combination, a three-phase, wound rotor induction motor having rotor windings and three rotor terminals therefor, and stator windings and three stator terminals therefor, three three-phase alternating current power leads, means connecting two of the power leads directly to two of the stator terminals to apply alternating current voltages to those terminals, a rectifier, and means connecting the said rectifier from the third power lead to the third stator terminal for applying rectified alternating current voltages to that terminal to produce rectified alternating currents flowing from the third power lead to the said third terminal and through the windings connected to that terminal, and means connecting a shunt circuit from one of the first two stator termials to the said third stator terminal for circulating rectified alternating currents from the said first-named terminal to the said third terminal, the said shunt circuit including a series rectifier connected in opposition to the rectifier and the said third power lead for maintaining high impedance paths between the power leads and for passing rectified alternating currents through the stator winding connected to the remaining one of the said two terminals, and a saturable reactor connected in series with the rectifier in the said shunt circuit for limiting the circulating currents in the said shunt circuit according to the amplitude of those currents.

4. Alternating current hoist apparatus comprising, in combination, a three-phase, wound rotor induction motor having rotor windings and three rotor terminals therefor, and stator windings and three stator terminals therefor, three three-phase alternating current power leads, means connecting two of the power leads directly to two of the stator terminals to apply alternating current voltage to those terminals, a rectifier, and means connecting the said rectifier from the third power lead to the third stator terminal for applying rectified alternating current voltages to that terminal to produce rectified alternating currents flowing from the third power lead to the said third terminal and through the windings connected to that terminal, and means connecting a shunt circuit from each of the first two stator terminals to the said third stator terminal for circulating rectified alternating currents from each of the said two terminals to the said third terminal, each shunt circuit including a series rectifier connected in opposition to the rectifier in the said third power lead for maintaining high impedance paths between the power leads and passing rectified alternating currents through the stator windings.

5. Alternating current hoist apparatus comprising, in combination, a three-phase, wound rotor induction motor having rotor windings and three rotor terminals therefor, and stator windings and three stator terminals therefor, secondary resistors connected to the three rotor terminals, three three-phase alternating current power leads, means for connecting the said power leads directly to the three stator terminals for hoisting drive, lowering drive means including means for connecting two of the power leads to two of the stator terminals to apply alternating current voltages to the said terminals, a rectifier and means for connecting the said rectifier from the third power lead to the third stator terminal for applying rectified alternating currents to that terminal to produce rectified alternating currents flowing from the third power lead to the said third terminal and through the windings connected to that terminal and circuit means, and two shunt circuit means and means connecting one of the said shunt circuit means from one of the first two stator terminals to the said third stator terminal and the remaining shunt circuit means from the remaining one of the two stator terminals to the third stator terminal for circulating rectified alternating currents from each of the said two terminals to the said third terminal, each shunt circuit means including a series rectifier connected in opposition to the rectifier in the said third power lead for maintaining a high impedance path for the voltages of the power leads and a relatively low impedance path for the counter-voltages generated by the motor and thereby generating braking torques during lowering drive.

6. Alternating current hoist apparatus comprising, in combination, a three-phase, wound rotor induction motor having rotor windings and three rotor terminals therefor, and stator windings and three stator terminals therefor, secondary resistors connected to the three rotor terminals, three three-phase alternating current power leads, means for connecting the said power leads directly to the three stator terminals for hoisting drive, lowering drive means including means for connecting two of the power leads to two of the stator terminals to apply alternating current voltages to the said terminals, a first rectifier and means for connecting the said rectifier from the third power lead to the third terminal for applying rectified alternating current voltages to that terminal to produce rectified alternating currents flowing from the third power lead to the said third terminal and through the windings connected to that terminal, shunt circuit means for circulating rectified alternating currents between one of the said two terminals and the said third terminal, and means for connecting the circuit means to those terminals during lowering drive, each circuit means including a series rectifier connected in opposition to the rectifier in the said third power lead for maintaining a high impedance path for the voltages of the power leads and a relatively low impedance path for the counter-voltages generated by the motor and thereby generating braking torque during lowering drive and for passing rectified alternating currents through the winding connected to the remaining one of the said two stator terminals associated therewith.

7. Alternating current hoist apparatus comprising, in combination, a three-phase, wound rotor induction motor having rotor windings and three rotor terminals therefor, and stator windings and three stator terminals therefor, secondary resistors connected to the three rotor terminals, three three-phase alternating current power leads, means for connecting the said power leads directly to the three stator terminals for hoisting drive, lowering drive means including means for connecting two of the power leads to two of the stator terminals to apply alternating current voltages to the said terminals, a first rectifier and means for connecting the said rectifier from the third power lead to the third terminal for applying rectified alternating current voltages to that terminal to produce rectified alternating currents flowing from the third power lead to the said third terminal and through the windings connected to that terminal, shunt circuit means for circulating rectified alternating current between one of the said two terminals and the said third terminal, and means for connecting the circuit means to those terminals during lowering drive, each circuit means including a series rectifier connected in opposition to the rectifier in the said third power lead for maintaining a high impedance path for the voltages of the power leads and a relatively low impedance path for the counter-voltages generated by the motor and thereby generate braking torque during lowering drive and means connected in series with the said rectifier for adjusting the magnitude of the circulating current so as to adjust the amount of braking torque generated in the motor.

8. The invention in accordance with claim 7, the said last-named means comprising a tapped saturable reactor and contactor means for selectively connecting different portions of the reactor in the shunt circuit.

9. The invention in accordance with claim 7, said last-named means comprising a saturable reactor and having a bias winding and means for supplying a bias current to the said bias winding and means for varying the amount of bias current in the bias winding to thereby adjust the reactance of the reactor and the impedance of the shunt circuit.

10. Alternating current hoist apparatus comprising, in combination, a three-phase, wound rotor induction motor having rotor windings and three rotor terminals therefor, and stator windings and three stator terminals therefor, secondary resistors connected to the three rotor terminals, three three-phase alternating current power leads, means for connecting the said power leads directly to the three stator terminals for hoisting drive, lowering drive means including means for connecting two of the power leads to two of the stator terminals to apply alternating current voltages to the said terminals, a first rectifier and means for connecting the said rectifier from the third power lead to the third terminal for applying rectified alternating current voltages to that terminal to produce rectified alternating currents flowing from the third power lead to the said third terminal and through the windings connected to that terminal, shunt circuit means for circulating rectified alternating currents between one of the said two terminals and the said third terminal, and means for connecting the circuit means to those terminals during lowering drive, each circuit means including a series rectifier connected in opposition to the rectifier in the said third power lead for maintaining a high impedance path for the voltages of the power leads and a relatively low impedance path for the counter-voltages generated by the motor and thereby generating braking torque during lowering drive.

11. The invention in accordance with claim 10 and means for selectively connecting and disconnecting either of the said shunt circuits between the associated terminals.

12. The invention in accordance with claim 10 and means for selectively modifying the impedance of the said shunt circuit impedance device.

13. The invention in accordance with claim 10 including a saturable reactor in each of the shunt circuits and means for adjusting the degree of saturation of one of the said reactors.

14. The invention in accordance with claim 10, the said impedance means comprising a saturable reactor in each of the said shunt circuits, and means for simultaneously changing the saturation of both reactors.

15. A control for alternating current hoist apparatus comprising, in combination, a master controller having a plurality of normally open contacts and cam means for successively closing the said contacts according to a predetermined schedule for hoisting or lowering drive, a main contactor connected to one of the controller contacts and adapted to be connected to three three-phase power leads and to a hoist motor for applying three-phase alternating current to the stator windings of the hoist motor for hoisting drive, and a plurality of acceleration contactors, each connected to a contact of the master controller and adapted to be connected to the rotor windings and acceleration resistors of the motor for changing the speed of the motor upon actution of the contactors by the controller, a series rectifier, a second main contactor connected to a contact of the master controller and to the series rectifier and adapted to be connected to the drive motor for reversibly connecting two of the three-phase alternating current power leads to stator windings of the drive motor and to connect the series rectifier in series with the third power lead, for applying rectified alternating current voltages to the stator windings to produce rectified alternating currents flowing from the third power lead through the windings to the remaining leads, two shunt circuits each having a series rectifier connected to the third power lead in opposition to the said first-named series rectifier at the motor side of that rectifier, and a contactor connected to a contact of the master controller and to the shunt circuits and adapted to connect the the shunt circuits to the two power leads for circulating rectified alternating currents through the associated stator windings of the motor to produce a braking torque upon the rotor, whereby the said drive motor may be energized for hoisting or lowering drive at any selected speed by operation of the master controller.

16. The invention in accordance with claim 15 and including a contactor connected to one of the contacts of the said master controller and connected in series with one of the shunt circuits for opening that shunt circuit while maintaining the connection of the remaining shunt circuit, whereby currents may be circulated through the stator windings associated with only two of the power leads for lowering relatively light loads.

17. The invention in accordance with claim 15 and including a saturable reactor connected in at least one of the shunt circuits for limiting the current in that circuit.

18. The invention in accordance with claim 17 and including a contactor connected to a contact of the master controller and across a part of a reactor for connecting only a portion of the reactor in the shunt circuit to reduce the impedance of the shunt circuit and increase the braking torque exerted upon the rotor of the motor at any speed.

19. The invention in accordance with claim 17 including a saturable reactor in each of the shunt circuits, each of the saturable reactors having a control winding and means for energizing both control windings, and means for simultaneously changing the energization of the two control windings for changing the braking torque exerted upon the rotor of the motor.

20. The invention in accordance with claim 15 including an impedance element connected in each of the shunt circuits, and means for adjusting each of the impedance elements independently of the remaining impedance element for independently controlling the circulating current in each of the shunt circuits.

21. The invention in accordance with claim 15 and including a tapped resistor in one of the shunt circuits for limiting the current in that circuit.

22. Apparatus for controlling a multi-phase alternating current motor having two stator windings and three power leads comprising, in combination, a line rectifier connected in series with a common one of the leads for applying a rectified alternating current voltage to both windings and a shunt circuit connected to the common power lead and one of the remaining power leads and adapted to be connected across one of the windings of the motor, the said shunt circuit including a rectifier for energizing the remaining one of the said two windings with rectified alternating current and for circulating currents through the said first winding, and a reactor connected in series in the shunt circuit for limiting the current therein.

23. The invention in accordance with claim 22, and including a plurality of magnetic contactors for selectively energizing the motor with alternating current voltages and selectively connecting the said line rectifier and shunt circuit to the motor, and a master controller for operatively actuating the said magnetic contactors.

24. Apparatus for controlling a multi-phase alternating current motor having two stator windings and three power leads comprising, in combination, a first line rectifier connected in series with a first one of two of the leads and a second line rectifier connected in series with the remaining one of the said two leads and in the same direction as the first line rectifier for applying a rectified alternating current to both of the windings, a first shunt circuit connected from the third power lead to the said first power lead at the motor side of the said first line rectifier, the said first shunt circuit incorporating a series rectifier connected in opposition to the said first line rectifier, and a second shunt circuit connected from the remaining one of the said two power leads on the motor side of the said second line rectifier and to the third power lead and a rectifier in the said second shunt circuit connected in opposition to the said second line rectifier, the said two shunt circuits being adapted to circulate currents through the said two stator windings when the power leads are connected to the windings.

25. The invention in accordance with claim 24, and including a plurality of magnetic contactors for selectively energizing the motor with alternating current voltages and selectively connecting the said line rectifier and shunt circuit to the motor, and a master controller for operatively actuating the said magnetic contactors.

26. Alternating current hoist apparatus comprising in combination, a three phase wound rotor induction motor having rotor windings and three rotor terminals therefor, and stator windings and three stator terminals therefor, three three-phase alternating current power leads connected to said stator terminals, means connecting a first shunt circuit from one of said stator terminals to a second stator terminal for circulating unidirectional current, means connecting a second shunt from a third stator winding to said second stator terminal for circulating unidirectional current, said shunt circuits including a rectifier in each for conducting the current in each shunt circuit in the direction of said second stator terminal, and impedance means connected in a series with each rectifier in each shunt circuit.

References Cited in the file of this patent

UNITED STATES PATENTS

| | | |
|---|---|---|
| 2,419,431 | Williams | Apr. 22, 1947 |
| 2,525,541 | Grepe | Oct. 10, 1950 |
| 2,534,423 | Douglas et al. | Dec. 19, 1950 |
| 2,637,007 | Picking et al. | Apr. 28, 1953 |

FOREIGN PATENTS

| | | |
|---|---|---|
| 175,785 | Switzerland | May 16, 1935 |
| 618,338 | Germany | Sept. 7, 1935 |